United States Patent
Liasi et al.

(10) Patent No.: US 7,578,192 B2
(45) Date of Patent: Aug. 25, 2009

(54) SYSTEM AND METHOD FOR MONITORING OPERATION OF A PRESS ASSEMBLY

(75) Inventors: Evangelos Liasi, Royal Oak, MI (US); Chandra Sekhar Jalluri, Canton, MI (US); Prashanth Magadi, Ypsilanti, MI (US); Gary Farquhar, Farmington Hills, MI (US)

(73) Assignee: Ford Motor Company, Dearborn, MI (US)

( * ) Notice: Subject to any disclaimer, the term of this patent is extended or adjusted under 35 U.S.C. 154(b) by 376 days.

(21) Appl. No.: 11/668,179

(22) Filed: Jan. 29, 2007

(65) Prior Publication Data

US 2008/0178676 A1  Jul. 31, 2008

(51) Int. Cl.
*G01M 13/00* (2006.01)

(52) U.S. Cl. ........................................................ 73/593

(58) Field of Classification Search .................... 73/593, 73/660

See application file for complete search history.

(56) References Cited

U.S. PATENT DOCUMENTS

| | | | |
|---|---|---|---|
| 4,980,844 A | 12/1990 | Demjanenko et al. | |
| 5,094,107 A * | 3/1992 | Schoch | 73/570 |
| 5,566,092 A | 10/1996 | Wang et al. | |
| 5,679,900 A * | 10/1997 | Smulders | 73/659 |
| 5,995,910 A | 11/1999 | Discenzo | |
| 6,122,565 A | 9/2000 | Wenning et al. | |
| 6,466,840 B1 | 10/2002 | Schoch | |
| 6,587,812 B1 | 7/2003 | Takayama | |
| 6,594,597 B1 | 7/2003 | Schoch | |
| 6,694,285 B1 | 2/2004 | Choe et al. | |
| 2004/0064277 A1* | 4/2004 | Samata et al. | 702/76 |
| 2006/0016233 A1* | 1/2006 | Schoch | 72/20.1 |

FOREIGN PATENT DOCUMENTS

| | | | |
|---|---|---|---|
| DE | 3940560 A1 * | 6/1990 | |
| JP | 04094819 A * | 3/1992 | |

OTHER PUBLICATIONS

Search Report dated Jan. 7, 2008, 1 page.

\* cited by examiner

*Primary Examiner*—Diego Gutierrez
*Assistant Examiner*—Rose M Miller
(74) *Attorney, Agent, or Firm*—Raymond Coppiellie; Brooks Kushman P.C.

(57) ABSTRACT

A system and method for monitoring operation of a press assembly includes establishing a baseline vibration level for a first location on the press assembly. The baseline vibration level defines a boundary for vibrations beyond which one or more press elements have a reduced life expectancy. Vibrations are measured at the first location and also at a second location during operation of the press. The vibrations measured at the first location are correlated with the vibrations measured at the second location, and a relationship between the vibrations at the first and second locations is established. Vibrations measured at the second location can then be adjusted and compared to the baseline vibration level to determine if adjustments to the press operation need to be made, or if certain press elements will need to be replaced prior to their expected life span.

19 Claims, 5 Drawing Sheets

SYSTEM AND METHOD FOR MONITORING OPERATION OF A PRESS ASSEMBLY

BACKGROUND OF THE INVENTION

1. Field of the Invention

The present invention relates to a system and method for monitoring operation of a press assembly.

2. Background Art

Because of the high impact, high force loading conditions present in some stamping press operations, various mechanical elements of the press may be prone to premature failure. For example, if it is estimated that a press will have a life span of five years based on certain production levels of stamped parts, and one or more of the press components fails after only one or two years, the components will have failed prematurely; this may result in significant downtime and lost revenue. Premature failure of press components may be particularly prevalent when an older press is reconfigured to perform stamping operations subject to impacts greater than those considered in the original design parameters.

FIG. 1 shows an example of a double action press 10 of the type that has been used in the stamping industry for many years. The press 10 includes a crown 12 and a press bed 14 supported on a foundation 16. The press 10 is known as a double action press because a blank holder slide 18 is moved downward in a first action, carrying with it an upper portion 20 of a blank holder 22. The upper portion 20 of the blank holder 22 captures a workpiece 24 between it and a lower portion 26 of the blank holder 22.

As shown in FIG. 1, the lower portion 26 of the blank holder 22 is firmly attached to the press bed 14 so there is little impact when the upper portion 20 engages the workpiece 24. After the workpiece 24 is securely clamped between the upper and lower portions 20, 26 of the blank holder 22, a drawing slide 28 is actuated and moved downward, carrying with it a portion of a die, or upper shoe 30. The upper shoe 30 contacts the workpiece 24, drawing it into another portion of the die, or lower shoe 32. Again, the impact of this action is not very high, since the movement is just the upper shoe 30 drawing the already fixed workpiece 24 into the lower shoe 32.

Attached to the crown 12 is a toggle drive system 34 made up of flywheels, gears, and other elements for which the labels have been removed in FIG. 1 for clarity. A slide connecting rod 36 connects the toggle drive 34 with the drawing slide 28. Similarly, a blank holder connecting rod 38 connects the toggle drive 34 with the blank holder slide 18. A motor 40, shown in phantom in FIG. 1, may be used to provide mechanical power to the toggle drive 34.

When the press 10 is operated as a double action press as shown in FIG. 1, the elements of the press 10 may each have an actual life span that generally coincides with its expected life span. One disadvantage of the configuration of the press 10 is that the orientation of the workpiece 24 may be upside down with respect to additional operations that need to be performed. Therefore, as explained in more detail below, double action presses, such as the press 10, may be reconfigured as a single action press with a reversed orientation for the workpiece. Although this facilitates faster transfers and additional operations on the workpiece, it may also result in higher impacts and premature failure for the press components.

Therefore, a need exists for a system and method for monitoring operation of a press to provide information related to the expected life span of the press components. This information can be used, for example, to alter operation of the press such that the press components will have actual life spans generally in accordance with their expected life spans, or conversely, can allow a production manager to predict component failure and perform preventative maintenance according to a planned schedule, rather than repairing and replacing failed components during an unexpected breakdown.

SUMMARY OF THE INVENTION

Embodiments of the present invention provide advantages over systems and methods that monitor operation of a stamping press using strain gauges to measure the deflection at various locations on the press. Embodiments of the present invention use vibration signatures to analyze the condition of various components on a press, such as a gear train, flywheel, coupling mechanism, and motor. The vibration signatures are acquired, and then parameters, such as root mean square (RMS), Kurtosis, and other statistical parameters can be used to provide trends for the data in both time and frequency domains. For example, if the raw vibration data is collected in a time domain, a Fast Fourier Transform (FFT) can be used to transform the data to a frequency domain as desired. The trend data can be automatically archived into system memory, and can be accessed through analysis software, operator interface, and an internet or intranet interface.

Embodiments of the system consist of several vibration sensors, for example, accelerometers, mounted at different locations on the press crown and press columns. These vibration sensors can be connected to a processing unit that includes one or more controllers and memories. The processing unit can also be interfaced with a programmable logic controller (PLC) associated with the press to provide additional information, such as crank angle, slide position, etc. The vibration sensors pick up vibrations of individual components on the press, and transmit this information to the processing unit.

The processing unit can be preprogrammed to calculate the various parameters, such as minimums, maximums, RMS, and Kurtosis, in the time and frequency domains. The processing unit can also apply statistical algorithms to the data from a user specified number of baseline cycles, which are used to set warning and alarm limits. Thus, embodiments of the system will provide a protective umbrella against catastrophic failures in addition to trending and tracking the vibration signatures to facilitate efficient preventative maintenance tasks. This helps to enable reliable performance of the press by providing continuous, real-time process monitoring of the vibration signatures.

Embodiments of the invention also provide a method for monitoring operation of a press assembly, which includes a press having a replaceable die attached thereto. The die is configured to form a workpiece, and the press includes a plurality of press elements, including a movable portion for moving a portion of the die, a mechanical power source, and a plurality of power transmission elements for transmitting mechanical power from the mechanical power source to the movable portion of the press. The method includes establishing a baseline vibration level for a first location on the press assembly. The baseline vibration level defines a boundary for vibrations beyond which one or more of the press elements have a reduced life expectancy.

Vibrations are measured at the first location on the press assembly, and are also measured at a second location on the press assembly, during operation of the press. The vibrations measured at the first location are correlated with the vibrations measured at the second location to establish a relationship between the vibrations at the first and second locations. Thus, for example, the baseline vibration level may be determined based on vibrations measured at or near one of the dies. A second location for vibration measurement may be chosen to be at or near one of the press elements on the press crown.

Correlating the time of the measurements between the measured vibrations at the two locations allows the vibrations to be matched so that a relationship may be determined. Because it may be inconvenient to continuously measure vibrations at or near the die, these measurements can be discontinued once the relationship between the vibrations at the two locations has been established. Thus, even though the baseline vibration level may have been established for vibrations at or near the die, continuous monitoring of vibration levels during operation of the press can be based on vibrations measured at locations well away from the die. This can provide an advantage over continually measuring vibrations at the die, since dies are frequency changed throughout production runs, and placing vibration sensors at or near the dies will require frequent sensor replacement.

Embodiments of the present invention also provide a method substantially similar to the one described above, wherein the baseline vibration level is established by measuring vibrations at a predetermined location on the die. Vibrations are then measured at this location on the die during operation of the press, simultaneously with the measurement of vibrations at a plurality of other predetermined locations on the press. The vibrations measured at the predetermined location on the die are correlated with the vibrations measured at each of the respective predetermined locations on the press, which establishes respective relationships between the vibrations at the predetermined location on the die, and each of the predetermined locations on the press.

Embodiments of the present invention also include a system for monitoring operation of a press assembly of the type described above. The system includes a sensor for sensing vibrations at a location on the press, and a control system in communication with the sensor and having at least one controller. The control system is configured with information establishing a relationship between the vibrations measured at the sensor location and vibration data measured at a predetermined location on the die. The control system is also configured with a baseline vibration level defining a boundary for vibrations beyond which one or more of the press elements have a reduced life expectancy.

The baseline vibration level is established based on vibrations measured at the predetermined location on the die. The control system is further configured to define a fault condition when a vibration measured by the sensor correlates to a vibration at the predetermined location on the die that exceeds the baseline vibration level. Because the various elements of the press may be able to withstand higher forces at certain positions, the baseline vibration level can be established such that it indicates an acceptable level of vibration for a given position of the press during its stroke.

DETAILED DESCRIPTION OF THE PREFERRED EMBODIMENT(S)

Figure 1:
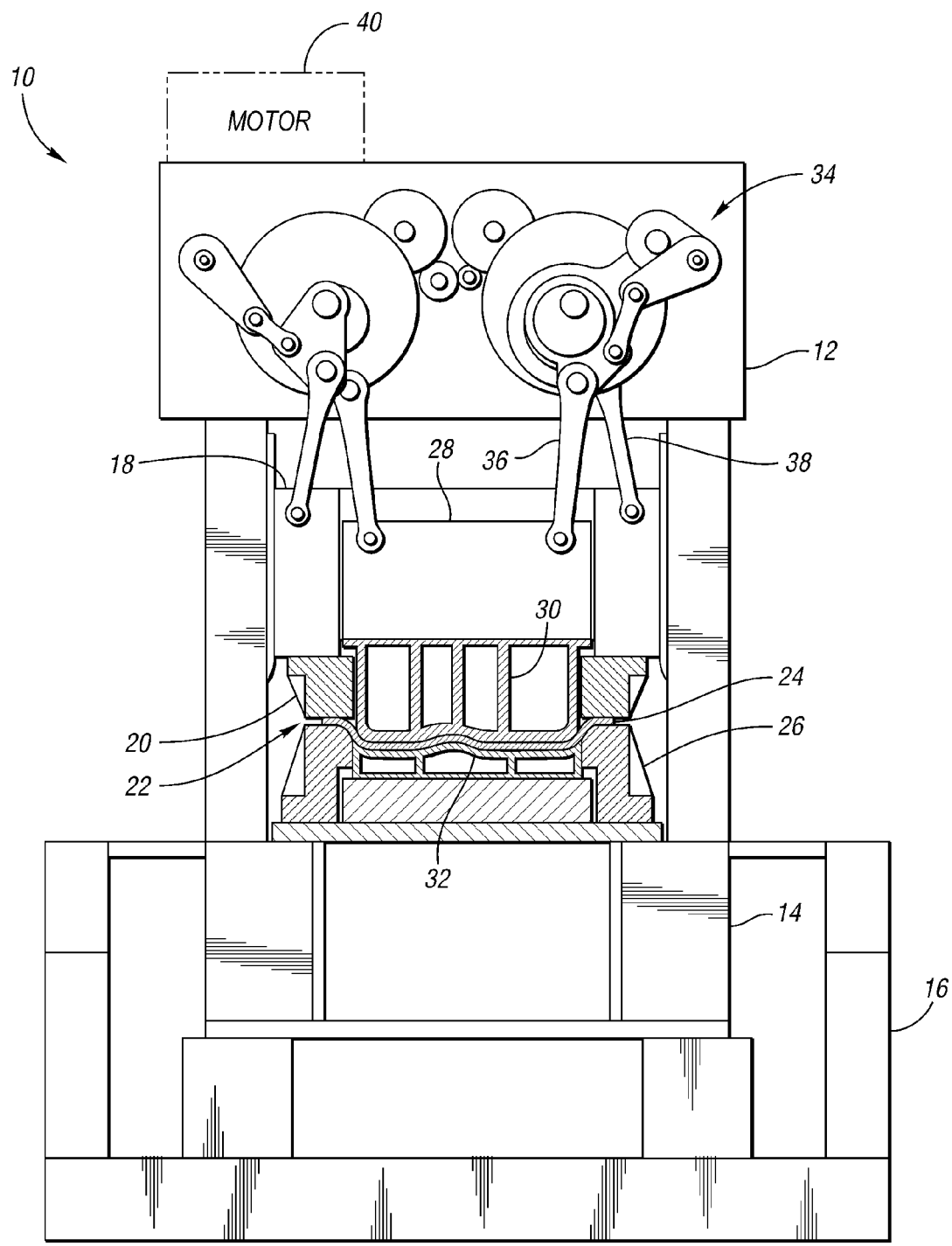
FIG. 1 shows a double action press having a two-piece blank holder, one piece of which is mounted to a blank holder slide, and another piece of which is mounted to the press bed.

As described above with regard to FIG. 1, many current production practices dictate that the orientation of the workpiece in a stamping press will be upside down as compared to the workpiece 24, shown in FIG. 1. Moreover, double action presses have given way to the more common single action presses, such as the press assembly 41 shown in FIG. 2. The press assembly 41 includes a press 42 and a removable die assembly 43. The press 42 includes a single slide, or drawing slide 44. Unlike the double action press 10, shown in FIG. 1, there is no blank holder slide, such as the slide 18. Rather, the drawing slide 44 is connected to a slide drive system 46 by two slide connecting rods 48, 50. As with the press 10, a mechanical power source is provided for the press 42, which is shown in phantom in FIG. 2 as motor 52. A press crown 54 is connected to a press bed 56 via press columns 58, 60.

The drawing slide 44 has attached to it an upper shoe 62 of the die assembly 43. The upper shoe 62 is configured to mate with another portion of the die assembly 43—specifically, a draw punch 64. The upper shoe 62 and the draw punch 64 work together to form a workpiece 66 into a desired shape. As described above, the press 10, shown in FIG. 1, includes a blank holder 22, having an upper portion 20 attached to the blank holder slide 18, and a lower portion 26 attached to the press bed 14. In contrast, the press 42, shown in FIG. 2, includes a single-piece blank holder 68 that is supported by nitrogen springs 70, 72. In addition, the press 42 includes a hydraulic draw cushion assembly 74 supported by the press foundation 76, which helps to absorb some of the impact forces during operation of the press 42.

Figure 2:
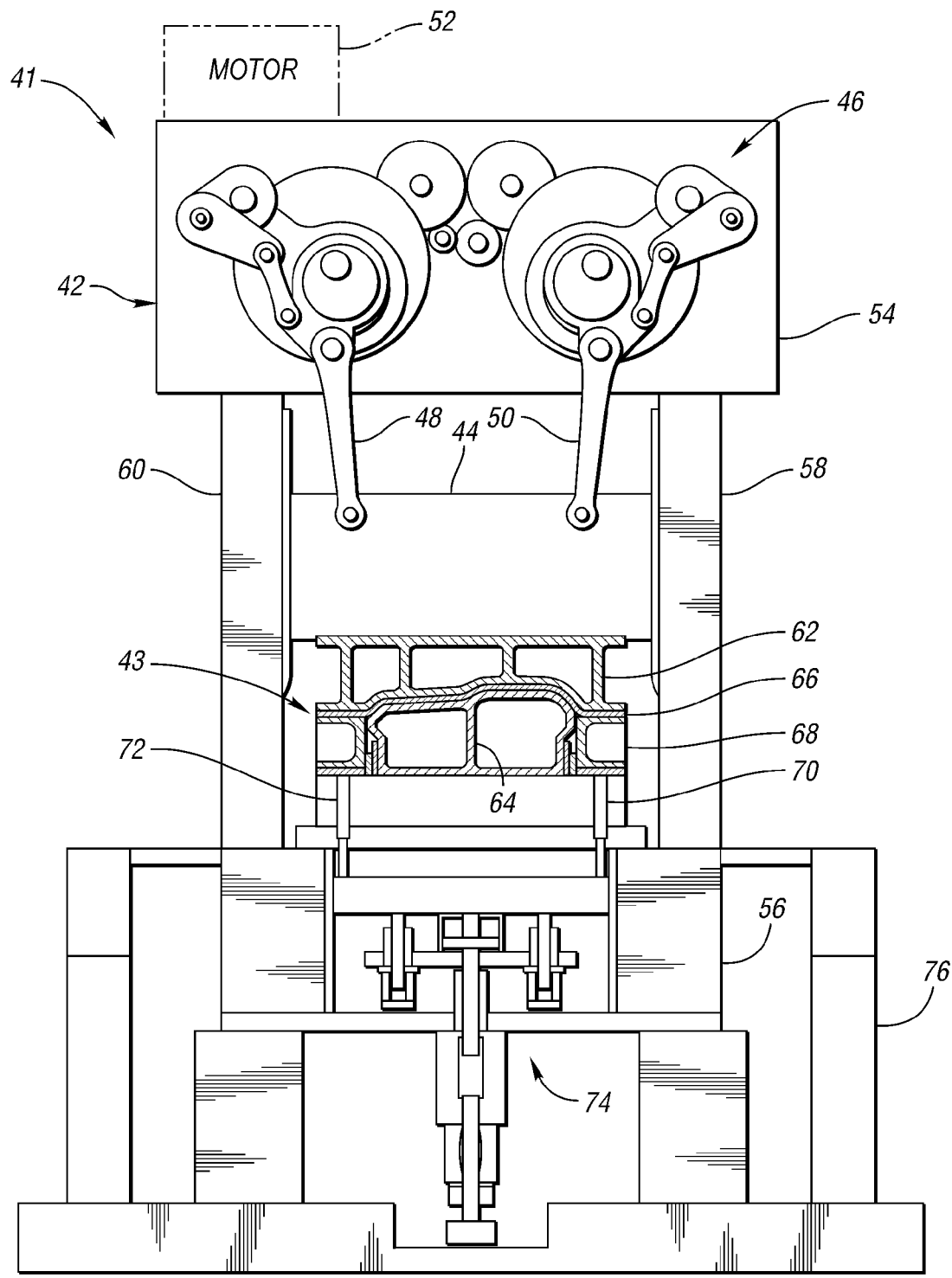
FIG. 2 shows a single action press having a one-piece blank holder supported on nitrogen springs.
Figure 3:
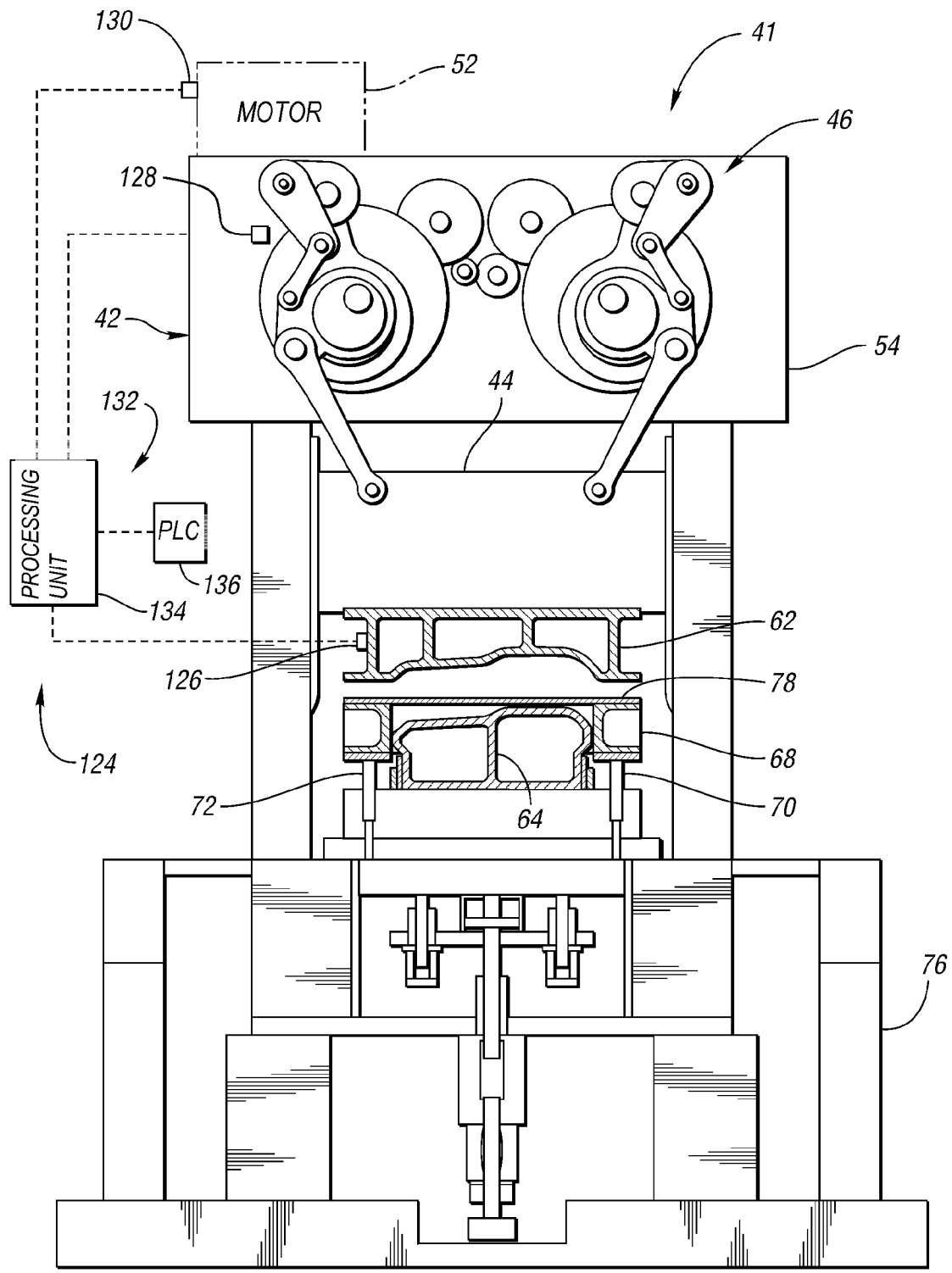
FIG. 3 shows the single action press of FIG. 2 with the drawing slide in an upward position prior to stamping a workpiece.

FIG. 3 shows the press 42 with the drawing slide 44 in a raised position, with an unformed workpiece 78 supported by the blank holder 68 above the draw punch 64. As shown in FIG. 3, the nitrogen springs 70, 72 raise the blank holder 68 above the top of the draw punch 64, such that the unformed workpiece 78 is supported by the blank holder 68. Although this configuration provides a convenient orientation for the finished workpiece, such as the workpiece 66 shown in FIG. 2, it also exposes the press 42 to much higher impacts than those seen by the press 10, shown in FIG. 1. This is due, in part, to the amount of mass that must be moved from zero velocity to match the velocity of the upper shoe 62 as the slide 44 moves downward. In particular, the upper shoe 62 will impact the workpiece 78, capture it between the upper shoe 62 and the blank holder 68, and then, the workpiece 78, and the blank holder 68, must be accelerated from zero to match the velocity of the upper shoe 62 as all three components move downward on the nitrogen cylinders 70, 72.

In contrast, the press 10, shown in FIG. 1, does not have a floating blank holder, but instead, has a lower portion 26 of the blank holder 22 that remains affixed to the press bed 14 such that it never accelerates. Moreover, by the time the upper shoe 30 contacts the workpiece 24, the workpiece 24 has been captured between the upper and lower portions 20, 26 of the blank holder 22, meaning that it does not move downward, except to be formed in accordance with the shape of the upper and lower shoes 30, 32. Thus, the press 42, shown in FIG. 3, is subjected to much higher impacts, and accordingly, its elements may be subject to premature failure.

Figure 4:
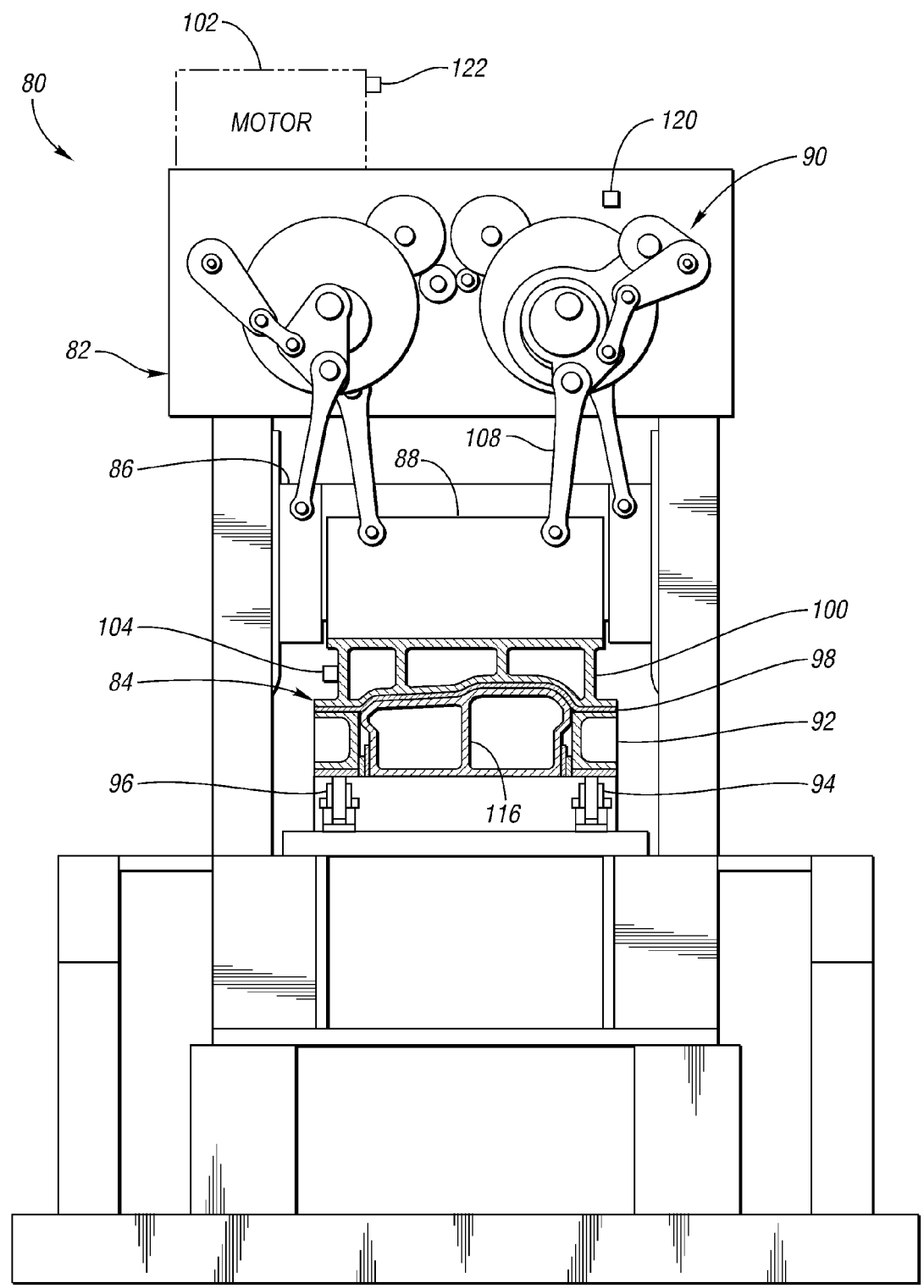
FIG. 4 shows a double action press that has been reconfigured to work like a single action press with a one-piece blank holder supported on nitrogen springs.

Although the double action press shown in FIG. 1 may not be subject to these high impact stresses because of its configuration, it is not uncommon for an older double action press to be reconfigured in a fashion similar to the single action press, shown in FIGS. 2 and 3, in order to reorient a workpiece to increase transfer speed and overall production rates. FIG. 4 shows a press assembly 80 including a press 82 having a removable die 84 attached thereto. The press 82, originally configured as a double action press, has a blank holder slide 86 and a drawing slide 88. Unlike the blank holder slide 18, shown in FIG. 1, the blank holder slide 86 does not engage the blank holder. Therefore, even though it is still connected to a slide drive system 90, it does not act on a blank holder. In fact, the press 82, includes a blank holder 92, which is similar to the blank holder 68, shown in FIGS. 2 and 3.

The blank holder 92 is supported on nitrogen springs 94, 96, and when the drawing slide 88 is raised upward, the nitrogen springs 94, 96 push the blank holder 92 upward, along with the workpiece 98. Similar to the operation of the press 42, shown in FIGS. 2 and 3, the press 82 is subject to a great deal of impact stress, as an upper shoe 100 of the die assembly 84 moves downward to impact the workpiece 98 and the blank holder 92. Again, the workpiece 98 and the blank holder 92 must accelerate from zero to the velocity of the upper shoe 100, which is dictated by movement of the drawing slide 88. Operation of the drawing slide 88, through the power transmission elements of the slide drive system 90, is effected by a motor 102, shown in phantom.

In order to provide vibration data that can be used, for example, to alter operation of a press, or predict when elements of the press need to be replaced, embodiments of the present invention use a number of vibration sensors, which may be in the form of accelerometers. In one embodiment of the present invention, a method is used to first establish a baseline vibration level for a press assembly, such as the press assembly 80, shown in FIG. 4. To establish this baseline level, a vibration sensor 104 is located at a position on or near the die assembly 84, for example, on the upper shoe 100, as shown in FIG. 4.

In order to capture peak vibrations it is desirable to have a very high data acquisition rate to retrieve the vibration information from the sensor 104. For example, the raw signals from the sensor 104 can be sampled at a rate of 51,200 samples per second, thereby enabling capture of signals with maximum frequency of up to 10 kilohertz (KHz). One way to establish the baseline vibration level is to measure the vibrations over a long period of time during many different operations, collecting the vibration history, and correlating this with mechanical failures of the press elements. In this way, a relationship between vibrations at the die assembly 84 and the failure of the press components can be determined.

Figure 5:
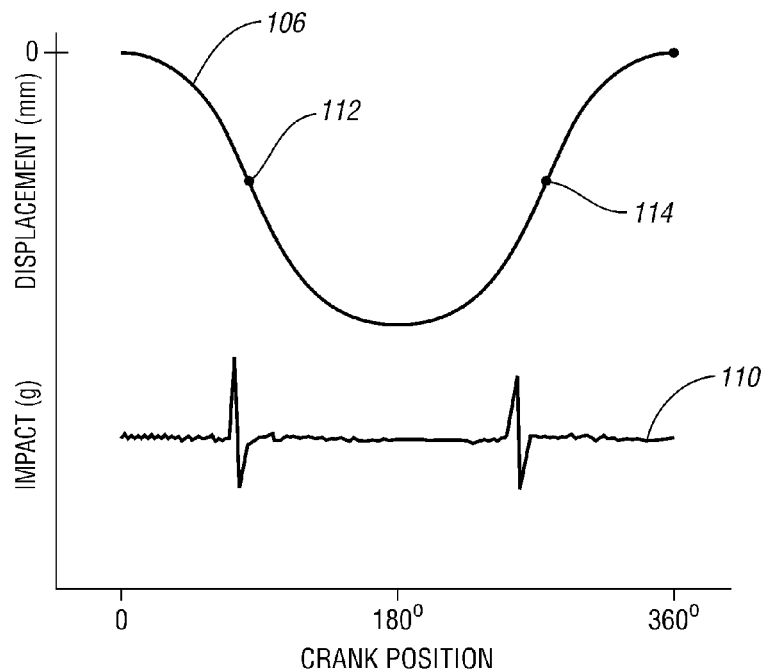
FIG. 5 shows a curve illustrating the relationship between linear displacement and crank position for the press shown in FIG. 4, and further shows a vibration trace for movement of the press measured at a location on the die.

Turning briefly to FIG. 5, a curve 106 is shown relating displacement of the drawing slide 88 with the angular position of one of the slide connecting rods, or cranks 108. FIG. 5 also shows a vibration trace 110 correlated with the crank position shown on the abscissa in FIG. 5. Two points 112, 114 on the curve 106 correlate to spikes in the vibration trace 110. These two positions 112, 114 respectively indicate the points of initial impact and return impact between the upper shoe 100 and the workpiece 98. In particular, the point 112 indicates the position at which the upper shoe 100 impacts the workpiece 98 and the blank holder 92 as they sit above draw punch 116 in a fashion similar to that shown in FIG. 3. The point 114 indicates the point at which the drawing slide 88, now moving upward, releases the workpiece 98 and the blank holder 92 such that their velocity decelerates quickly to zero.

Figure 6:
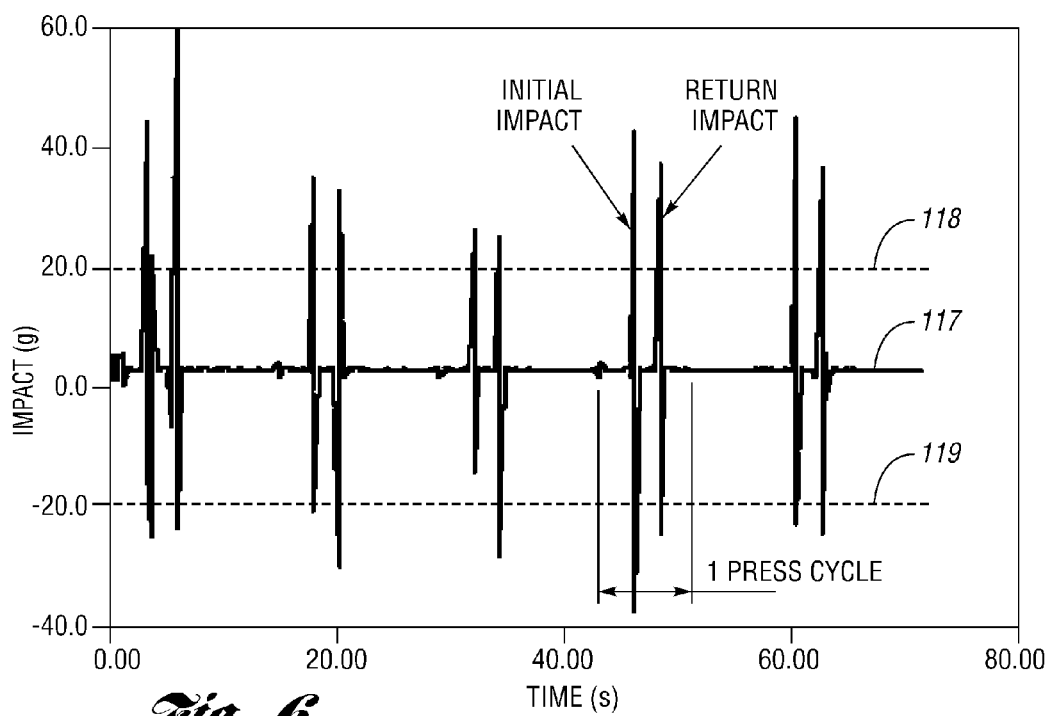
FIG. 6 shows a measured vibration trace and a baseline vibration level for the die shown in FIG. 4.

As described above, correlating vibration data, such as the data shown in the vibration trace 110, with known failures of various elements of a press, such as the press 82, allows a baseline vibration level to be established. FIG. 6 shows an RMS vibration trace 117 in a time domain and a baseline vibration level denoted by lines 118, 119 at +20 g. The lines 118, 119 define a boundary for vibrations measured on the upper shoe 100 beyond which one or more of the elements of the press 82 will have a reduced life expectancy—i.e., one or more of the elements, such as the crank 108 or one of the other connecting elements, will fail well before its rated life span.

As shown in FIG. 6, the points of initial impact and return impact exceed the baseline vibration level—as indicated by lines 118, 119—while the remaining portions of each press cycle do not. Although the baseline vibration level is defined in FIG. 6 by two horizontal lines 118, 119, a baseline vibration level may also be defined as a curve, indicating a variable level of vibration depending on where in the press cycle the vibration occurs. For example, it may be determined that higher vibrations are acceptable when the crank position is at 180°—i.e., the drawing slide 88 is at its lowest position. This is because the crank 108 is essentially vertical at this point, and as such, it acts as a two-force member. Thus, there is virtually no transverse stress when the crank position is at 180°, and the acceptable level of vibration may accordingly be higher.

Returning to FIG. 4, it is contemplated that during operation of the press assembly 80, the die assembly 84 will often be changed to accommodate production of different products. Thus, it may be inconvenient to continue to monitor vibrations on the upper shoe 100, or any part of the die assembly 84. Therefore, embodiments of the present invention contemplate the use of one or more additional sensors, such as a sensor 120 adjacent the slide drive system 90, and the sensor 122 attached to the motor 102. During operation of the press assembly 80, vibrations can continue to be measured at the sensor 104, and the sensors 120, 122. Vibration traces for a given time period can be correlated to establish a relationship between the vibrations at the first location—i.e., at the location of the sensor 104—with the vibrations measured at second and third locations by the sensors 120, 122.

Typically, the vibrations measured by the sensors 120, 122, will be lower than the vibrations measured by the sensor 104. Thus, vibrations measured at the sensors 120, 122 would likely never exceed the baseline vibration level shown in FIG. 6. This is why embodiments of the present invention contemplate establishing a relationship between the vibrations, for example, measured by the sensor 104, and the vibrations measured by other sensors. In this way, the vibrations measured by the sensors 120, 122 can be appropriately adjusted based on this relationship so that the adjusted vibration data can be used in conjunction with the baseline vibration level indicated by lines 118, 119.

Once the relationship between the measured vibrations of the sensor 104 and the sensors 120, 122 has been established, the sensor 104 can be removed with only the more permanently mounted sensors 120, 122 remaining. The vibration data can continue to be gathered from the sensors 120, 122, and analyzed in accordance with typical vibration analysis, such as using a time domain, or transforming the raw data using a mathematical transform, such as an FFT to provide information in a frequency domain. The adjusted vibration data can continue to be analyzed in light of the baseline vibration level, for example, as indicated by lines 118, 119 in FIG. 6. The determined relationship may, for example, indicate that the vibration measured on the upper shoe 100 by the sensor 104 is approximately four times the vibration measured by the sensor 120, for any given press loading. In such a case, vibrations measured by the sensor 120 can be increased by a factor of four, and directly compared to the baseline vibration level indicated by lines 118, 119 in FIG. 6.

Embodiments of the present invention also contemplate using the relationship between the vibrations measured at a die assembly, such as the vibrations measured by the sensor 104, and the vibrations measured at other locations, such as the vibrations measured by the sensors 120, 122, to adjust the baseline vibration level. For example, instead of adjusting the measured vibration data as discussed above, the lines 118, 119 could be appropriately adjusted to be applicable to the raw data measured by the sensor 120 or the sensor 122. Using the example from above, the baseline vibration level could be reduced by a factor of four, such that the lines 118, 119 were moved inward to approximately +5 g.

Embodiments of the present invention include a system for monitoring operation of a press assembly, for example, a system shown generally at 124 in FIG. 3. The system 124 includes vibration sensors 126, 128, 130, each of which is in communication with a control system 132. The control system 132 includes a processing unit 134 having an electronic controller and memory therein, and a PLC 136 connected to the processing unit 134. As described above, a baseline vibration level defining a boundary for vibrations beyond which one or more of the elements of the press 42 have a reduced life expectancy can be determined empirically through observation of the press operation correlated with information measured by a sensor, such as the sensor 126 on the upper shoe 62.

The baseline vibration level can be established using a system, such as the system 124, or it can be independently established. The baseline vibration level information, such as shown in FIG. 6, can be stored in the processing unit 134, for example, in the form of a lookup table. The PLC 136 provides additional information to the processing unit 134 related to specific operation of the press 42, such as the position of the elements of the drive system 46 and the position of the drawing slide 44. The processing unit 134 also receives vibration data from the sensors 128, 130, and can correlate this information with information measured from the sensor 126 on the upper shoe 62.

The processing unit 134 can use one or more preprogrammed algorithms to establish a relationship between the vibration data measured by the sensor 126 and the other vibration data input from the other sensors, such as the sensors 128, 130. Even after the sensor 126 is removed from the upper shoe 62, the processing unit 134 can continue to receive information from the sensors 128, 130, and compare this information to the previously determined baseline vibration level. If at any time, vibrations measured by the sensors 128, 130 exceed the baseline vibration level, the processing unit 134 can send an appropriate fault signal to alert an operator or production manager that an adjustment needs to be made. For example, it may be desirable to adjust some of the operation parameters of the press to help ensure that the vibration levels remains below the baseline vibration level, or it may be determined that keeping these vibration levels above the baseline vibration level is acceptable, understanding that certain press elements may need to be replaced before they have reached their expected life span.

While the best mode for carrying out the invention has been described in detail, those familiar with the art to which this invention relates will recognize various alternative designs and embodiments for practicing the invention as defined by the following claims.

What is claimed:

1. A method for monitoring operation of a press assembly including a press having a replaceable die attached thereto, the die being configured to form a workpiece, the press including a plurality of press elements, including a movable portion for moving a portion of the die, a mechanical power source, and a plurality of power transmission elements for transmitting mechanical power from the mechanical power source to the movable portion of the press, the method including:

establishing a baseline vibration level for a first location on the press assembly, the baseline vibration level defining a boundary for vibrations beyond which one or more of the press elements have a reduced life expectancy;

measuring vibrations at the first location on the press assembly during operation of the press;

measuring vibrations at a second location on the press assembly during operation of the press; and correlating the measured vibrations at the first location with the measured vibrations at the second location to establish a relationship between the vibrations at the first and second locations.

2. The method of claim 1, further comprising discontinuing measuring vibrations at the first location after a relationship has been established between the vibrations at the first and second locations.

3. The method of claim 2, further comprising defining a fault condition when a measured vibration at the second location correlates to a vibration at the first location that exceeds the baseline vibration level.

4. The method of claim 1, wherein the step of establishing the baseline vibration level for the first location includes measuring vibrations on a portion of the die during a plurality of operations of the press, and determining an acceptable level of vibration for the die for a plurality of positions of the movable portion of the press.

5. The method of claim 4, wherein the step of determining an acceptable level of vibration includes determining a level of vibration for the die below which none of the press elements exhibits premature failure.

6. The method of claim 1, wherein the second location is chosen to be a location having lower measured vibrations than the vibrations measured at the first location.

7. The method of claim 1, wherein the second location is chosen to be a location on the press.

8. The method of claim 1, wherein the second location is chosen to be a location proximate one of the power transmission elements.

9. The method of claim 1, further comprising defining a baseline vibration level for the second location based on the established relationship between the measured vibrations at the first location and the measured vibrations at the second location.

10. The method of claim 9, further comprising defining a fault condition when a measured vibration at the second location exceeds the baseline vibration level for the second location.

11. The method of claim 1, wherein the vibrations are measured at the second location using an acquisition rate of greater than 5000 Hertz.

12. A method for monitoring operation of a press assembly including a press having a replaceable die attached thereto, the die being configured to form a workpiece, the press including a plurality of press elements, including a movable portion for moving a portion of the die, a mechanical power source, and a plurality of power transmission elements for transmitting mechanical power from the mechanical power source to the movable portion of the press, the method including:

establishing a baseline vibration level at a predetermined location on the die, the baseline vibration level defining a boundary for vibrations beyond which one or more of the press elements have a reduced life expectancy;

measuring vibrations at the predetermined location on the die during operation of the press;

measuring vibrations at a plurality of predetermined locations on the press during operation of the press; and correlating the measured vibrations at the predetermined location on the die with the measured vibrations at each of the respective predetermined locations on the press to establish respective relationships between the vibrations at the predetermined location on the die and each of the predetermined locations on the press.

13. The method of claim 12, further comprising defining a fault condition when a measured vibration at any one of the predetermined locations on the press correlates to a vibration at the predetermined location on the die that exceeds the baseline vibration level.

14. The method of claim 13, wherein at least one of the predetermined locations on the press is chosen to be a location having lower measured vibrations than the vibrations measured at the predetermined location on the die.

15. The method of claim 14, further comprising defining respective baseline vibration level for each of the predetermined locations on the press based on the established relationships between the vibrations at the predetermined location on the die and each of the predetermined locations on the press.

16. The method of claim 15, further comprising defining a fault condition when a measured vibration at any of the predetermined locations on the press exceeds the respective baseline vibration level.

17. A system for monitoring operation of a press assembly including a press having a replaceable die attached thereto, the die being configured to form a workpiece, the press including a plurality of press elements, including a movable portion for moving a portion of the die, a mechanical power source, and a plurality of power transmission elements for transmitting mechanical power from the mechanical power source to the movable portion of the press, the system comprising:

a sensor for sensing vibrations at a location on the press; and a control system in communication with the sensor and including at least one controller, the control system being configured with:

information establishing a relationship between the vibrations measured at the sensor location and vibration data measured at a predetermined location on the die, and a baseline vibration level defining a boundary for vibrations beyond which one or more of the press elements have a reduced life expectancy, the baseline vibration level being established based on vibrations measured at the predetermined location on the die, the control system being further configured to define a fault condition when a vibration measured by the sensor correlates to a vibration at the predetermined location on the die that exceeds the baseline vibration level.

18. The system of claim 17, further comprising a plurality of the sensors for sensing vibrations at respective locations on the press, and wherein the control system is further configured with information establishing a respective relationship between the vibrations measured at each of the sensor locations and vibration data measured at the predetermined location on the die.

19. The system of claim 18, wherein the control system is further configured to define a fault condition when a vibration measured by any of the sensors correlates to a vibration at the predetermined location on the die that exceeds the baseline vibration level.

* * * * *